US011182594B2

(12) United States Patent
Lai et al.

(10) Patent No.: US 11,182,594 B2
(45) Date of Patent: Nov. 23, 2021

(54) FACE IMAGE RETRIEVAL METHODS AND SYSTEMS, PHOTOGRAPHING APPARATUSES, AND COMPUTER STORAGE MEDIA

(71) Applicant: SHENZHEN SENSETIME TECHNOLOGY CO., LTD., Guangdong (CN)

(72) Inventors: Haibin Lai, Shenzhen (CN); Ningyuan Mao, Shenzhen (CN); Qingzheng Li, Shenzhen (CN); Wenzhi Liu, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 36 days.

(21) Appl. No.: 16/732,225

(22) Filed: Dec. 31, 2019

(65) Prior Publication Data
US 2020/0151434 A1 May 14, 2020

Related U.S. Application Data

(63) Continuation of application No. PCT/CN2018/102267, filed on Aug. 24, 2018.

(30) Foreign Application Priority Data

Aug. 31, 2017 (CN) .......................... 201710774389.9

(51) Int. Cl.
*G06K 9/00* (2006.01)
*G06F 16/583* (2019.01)
(Continued)

(52) U.S. Cl.
CPC ....... *G06K 9/00288* (2013.01); *G06F 16/532* (2019.01); *G06F 16/538* (2019.01);
(Continued)

(58) Field of Classification Search
CPC .... G06N 3/08; G06K 9/6232; G06K 9/00744; G06K 9/00268; G06K 9/00255;
(Continued)

(56) References Cited

U.S. PATENT DOCUMENTS 6,219,640 B1 * 4/2001 Basu ................... G06K 9/6293
704/246
9,916,531 B1 * 3/2018 Zivkovic ................. G06N 3/08
(Continued)

FOREIGN PATENT DOCUMENTS

CN 104765768 A 7/2015
CN 105760933 A 7/2016
(Continued)

OTHER PUBLICATIONS

Second Office Action of the Chinese application No. 201710774389.9, dated Aug. 31, 2020.
(Continued)

*Primary Examiner* — Mia M Thomas
(74) *Attorney, Agent, or Firm* — Syncoda LLC; Feng Ma

(57) ABSTRACT

A face image retrieval method includes: obtaining to-be-retrieved face information corresponding to a to-be-retrieved image by a convolutional neural network, the convolutional neural network being configured with corresponding convolution calculation configuration information by a processor, the convolutional neural network including at least one convolutional layer, the convolution calculation configuration information including a data bit width value corresponding to each convolutional layer in the convolutional neural network, and the to-be-retrieved image including at least one face region; searching a database for matched preset face image information that matches the to-be-retrieved face information, the database storing at least one piece of preset face image information; and outputting
(Continued)

the preset face image information that matches the to-be-retrieved face information.

19 Claims, 7 Drawing Sheets

(51) Int. Cl.
| | | |
|---|---|---|
| *G06F 16/783* | (2019.01) | |
| *G06F 16/538* | (2019.01) | |
| *G06F 16/532* | (2019.01) | |
| *G06K 9/62* | (2006.01) | |
| *G06N 3/08* | (2006.01) | |

(52) U.S. Cl.
CPC ......... *G06F 16/583* (2019.01); *G06F 16/784* (2019.01); *G06K 9/00255* (2013.01); *G06K 9/00268* (2013.01); *G06K 9/00744* (2013.01); *G06K 9/6232* (2013.01); *G06N 3/08* (2013.01)

(58) Field of Classification Search
CPC .... G06F 16/532; G06F 16/538; G06F 16/784; G06F 16/583
See application file for complete search history.

(56) References Cited

U.S. PATENT DOCUMENTS

| | | | | |
|---|---|---|---|---|
| 10,353,706 | B2* | 7/2019 | Kaul | G06F 9/3001 |
| 2006/0190222 | A1* | 8/2006 | Allen | G06F 30/33 |
| | | | | 703/2 |
| 2006/0190223 | A1* | 8/2006 | Allen | G06F 30/3323 |
| | | | | 703/2 |
| 2016/0275341 | A1* | 9/2016 | Li | G06K 9/4642 |
| 2017/0116467 | A1* | 4/2017 | Li | G06T 7/246 |
| 2017/0359208 | A1* | 12/2017 | Wang | H03M 13/6505 |
| 2018/0150721 | A1* | 5/2018 | Mostafa | G06N 3/063 |
| 2018/0189215 | A1* | 7/2018 | Boesch | G06N 3/08 |
| 2018/0189643 | A1* | 7/2018 | Kim | G06F 17/153 |
| 2019/0012170 | A1* | 1/2019 | Qadeer | G06F 9/30134 |
| 2019/0303757 | A1* | 10/2019 | Wang | G06F 9/5027 |
| 2020/0050918 | A1* | 2/2020 | Chen | G06F 9/30014 |
| 2020/0193270 | A1* | 6/2020 | Wu | G06N 3/0454 |
| 2020/0293865 | A1* | 9/2020 | Liu | G06N 3/08 |
| 2020/0302289 | A1* | 9/2020 | Ren | G06N 5/046 |
| 2020/0410510 | A1* | 12/2020 | Lau | G06N 3/08 |
| 2021/0049403 | A1* | 2/2021 | Pan | G06K 9/623 |

FOREIGN PATENT DOCUMENTS

| | | |
|---|---|---|
| CN | 106204948 A | 12/2016 |
| CN | 205792930 U | 12/2016 |
| CN | 106529517 A | 3/2017 |
| CN | 106650691 A | 5/2017 |
| CN | 106682650 A | 5/2017 |
| CN | 106897695 A | 6/2017 |
| CN | 108228696 A | 6/2018 |
| JP | 2016018486 A | 2/2016 |
| WO | 2016095117 A1 | 6/2016 |

OTHER PUBLICATIONS

International Search Report in the international application No. PCT/CN2018/102267, dated Nov. 28, 2018.
English Translation of the Written Opinion of the International Search Authority in the international application No. PCT/CN2018/102267, dated Nov. 28, 2018.
First Office Action in the Chinese application No. 201710774389.9, dated Jan. 2, 2020.
First Office Action of the Japanese application No. 2019-571526, dated Feb. 4, 2021.

* cited by examiner

FACE IMAGE RETRIEVAL METHODS AND SYSTEMS, PHOTOGRAPHING APPARATUSES, AND COMPUTER STORAGE MEDIA

CROSS-REFERENCE TO RELATED APPLICATIONS

The present application is a continuation of International Application No. PCT/CN2018/102267 filed on Aug. 24, 2018, which claims priority to Chinese Patent Application No. 201710774389.9 filed on Aug. 31, 2017. The disclosures of these applications are hereby incorporated by reference in their entirety.

BACKGROUND

In recent years, with the increasing growth of security system, the continuous expansion of monitoring points and the popularity of high-definition monitoring devices, image and video information obtained by monitoring shows an explosive growth. The storage and retrieval of conventional video monitoring systems are facing enormous challenges. How to quickly and efficiently extract useful information from massive images and videos is very important. To this end, people have introduced face recognition technologies into video monitoring systems, and the face recognition technologies rely heavily on the support of convolutional neural networks. However, the convolutional neural networks require a large amount of computation, which leads to low efficiency of face image retrieval.

SUMMARY

The present disclosure relates to computer vision technologies, and in particular, to face image retrieval methods and systems, photographing apparatuses, and computer storage media.

According to one aspect of embodiments of the present disclosure, provided is a face image retrieval method, including: obtaining to-be-retrieved face information corresponding to a to-be-retrieved image by a convolutional neural network, the convolutional neural network being configured with corresponding convolution calculation configuration information by a processor, the convolutional neural network including at least one convolutional layer, the convolution calculation configuration information including a data bit width value corresponding to each convolutional layer in the convolutional neural network, and the to-be-retrieved image including at least one face region; searching a database for matched preset face image information that matches the to-be-retrieved face information, the database storing at least one piece of preset face image information; and outputting the preset face image information that matches the to-be-retrieved face information.

According to another aspect of embodiments of the present disclosure, provided is a photographing apparatus, including: a memory storing processor-executable instructions; and a processor arranged to execute the stored processor-executable instructions to perform steps of: obtaining to-be-retrieved face information corresponding to a to-be-retrieved image by a convolutional neural network, the convolutional neural network being configured with corresponding convolution calculation configuration information by a processor, the convolutional neural network comprising at least one convolutional layer, the convolution calculation configuration information comprising a data bit width value corresponding to each convolutional layer in the convolutional neural network, and the to-be-retrieved image comprising at least one face region; and searching a database for matched preset face image information that matches the to-be-retrieved face information, the database storing at least one piece of preset face image information; and outputting the preset face image information that matches the to-be-retrieved face information.

According to another aspect of embodiments of the present disclosure, provided is a photographing apparatus, including: a convolution calculation section, configured to obtain to-be-retrieved face information corresponding to a to-be-retrieved image by a convolutional neural network, the to-be-retrieved image including at least one face region, the convolutional neural network being configured with convolution calculation configuration information, the convolutional neural network including at least one convolutional layer, the convolution calculation configuration information including a data bit width value corresponding to each convolutional layer in the convolutional neural network, and the to-be-retrieved image including at least one face region; a processor, configured to configure corresponding convolution calculation configuration information for a convolutional neural network; and a retrieval section, configured to: search a database for matched preset face image information that matches the to-be-retrieved face information, the database storing at least one piece of preset face image information; and output the preset face image information that matches the to-be-retrieved face information.

According to another aspect of the embodiments, provided is a face image retrieval system, which is provided with the photographing apparatus as stated above.

According to another aspect of the embodiments, provided is a non-transitory computer storage medium, which is configured to store computer-readable instructions, where when the instructions are executed, operations of the face image retrieval method as stated above are executed.

By the accompanying drawings and embodiments, the technical solutions of the present disclosure are further described below in details.

DETAILED DESCRIPTION

Figure 1:
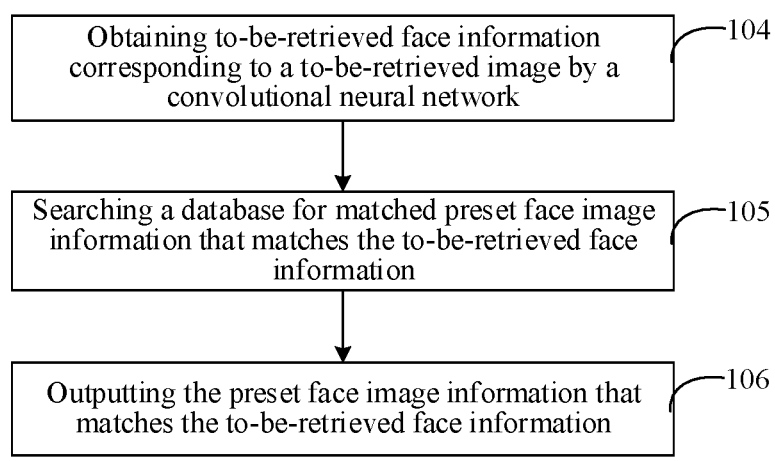
FIG. 1 is a flowchart of an embodiment of a face image retrieval method according to the present disclosure.

Exemplary embodiments of the present disclosure are described in detail with reference to the accompany drawings now. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each section shown in the accompanying drawings is not drawn in actual proportion.

The following descriptions of at least one exemplary embodiment are merely illustrative actually, and are not intended to limit the present disclosure and the applications or use thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed computing environments, the program modules may be located in local or remote computing system storage media including storage devices.

In the process of implementing the present disclosure, the inventors have found through research that in the existing video monitoring system, face detection and recognition are both implemented in a back-end server, and the front end is only responsible for the collection, coding and transmission of image data. The mode of front end and back end combined operation requires a large network bandwidth. In addition, since most of transmitted video stream data is useless information, the efficiency of efficient data extraction by the back-end server is greatly reduced. Furthermore, since the image has undergone lossy coding before transmission, the data obtained by the back-end server is not the original image data, which may lead to missed detection or false detection to a certain extent.

The prior art provides a front-end face capture machine. Although the face capture machine improves the accuracy of face recognition, it only deploys a central processing unit and recognition and storage modules originally deployed on the back-end server on the front-end video monitoring device. Due to the huge number of monitoring images and videos, the power consumption and costs of the monitoring machine are relatively high, and it is difficult to achieve the effect of real-time face detection. Therefore, the face capture machine has no application value in practical application scenarios.

FIG. 1 is a flowchart of an embodiment of a face image retrieval method according to the present disclosure. As shown in FIG. 1, the method is applied to a photographing apparatus, and the method according to the embodiments includes following operations 104 to 106.

At operation 104, to-be-retrieved face information corresponding to a to-be-retrieved image is obtained by a convolutional neural network.

The convolutional neural network is configured with corresponding convolution calculation configuration information by a processor. The convolutional neural network includes at least one convolutional layer. The convolution calculation configuration information includes a data bit width value corresponding to each convolutional layer in the convolutional neural network. The to-be-retrieved image includes at least one face region. The to-be-retrieved image may be obtained according to a retrieval instruction, and the retrieval instruction may be delivered by a server or a cloud, or an externally inputted to-be-retrieved image and retrieval instruction are directly received. To retrieve and recognize an image, the recognition is usually performed based on corresponding face information. In this operation, the corresponding to-be-retrieved face information is obtained through processing by the convolutional neural network, and image retrieval in the subsequent retrieval is converted to face information retrieval, so that the retrieval is faster and no subsequent conversion is needed, and the convolutional neural network may be pre-trained.

At operation 105, a database is searched for matched preset face image information that matches the to-be-retrieved face information.

The database stores at least one piece of preset face image information. Face detection and recognition are implemented in the photographing apparatus by setting the database, thereby greatly reducing the requirement for network bandwidth and improving the efficiency of data transmission. The process of face detection and retrieval may be completed by a Field-Programmable Gate Array System on Chip (FPGA SoC). The FPGA SoC integrates an FPGA logic block and a CPU to one monocrystalline silicon wafer. The communication between the FPGA logic block and the CPU is performed by an Advanced Extensible Interface (AXI), and there is a very large physical bandwidth, so that the disadvantage in the existing solution that the separate arrangement of the FPGA logic block and the CPU requires a very large bandwidth to implement communication is overcome. Moreover, the unique performance per watt advantage of the FPGA SoC makes the power consumption of the whole machine less than 4W, which is more suitable for use in various severe environments. The FPGA may simultaneously perform data parallel and task parallel computations, divide one task into multistage pipelined operations (simultaneous processing), and reduce the detection time of each frame to less than 40 ms, thereby greatly improving the real-time detection effect. Data parallel refers to the image data inputted by each convolutional layer and the data transmitted between network layers, and different channels may be created for simultaneous processing according to needs; and task parallel refers to that convolution, pooling, and full connection in a neural network may be executed in parallel. However, a conventional embedded system on chip only integrates the CPU and functional modules to one monocrystalline silicon wafer. Moreover, without setting the FPGA logic block, it is difficult to implement real-time face recognition, which only may be implemented with the help of a back-end server or more powerful processor.

At operation 106, the preset face image information that matches the to-be-retrieved face information is outputted.

Based on the face image retrieval method provided by the foregoing embodiment of the present disclosure, to-be-retrieved face information corresponding to a to-be-retrieved image is obtained by a convolutional neural network; the convolutional neural network is configured with corresponding convolution calculation configuration information by a processor; because the convolutional neural network is configured with the convolution calculation configuration information, bit widths of images inputted to all convolutional layers in the convolutional neural network correspond to the convolutional layers, thus reducing the amount of calculation of face recognition based on the convolutional neural network and improving the processing efficiency of the convolutional layers; moreover, the to-be-retrieved face information can be quickly and accurately obtained from the inputted to-be-retrieved images, thus solving the problems of low calculation accuracy of fixed-point operation and the influence on the accuracy of the calculation result, and improving the operational precision of the convolutional neural network; a database is searched for matched preset face image information that matches the to-be-retrieved face information; and the preset face image information that matches the to-be-retrieved face information is outputted. By searching the database set in the photographing apparatus for the matched preset face image information, the effect of real-time face retrieval is achieved, and the efficiency of face image retrieval is improved.

According to another embodiment of the face image retrieval method according to the present disclosure, on the basis of the foregoing embodiments, operation 104 includes:

reading the to-be-retrieved image from a front-end memory according to the convolution calculation configuration information, the bit width of the to-be-retrieved image being equal to the data bit width value; and performing convolution calculation on the to-be-retrieved image by the convolutional neural network to obtain the to-be-retrieved face information.

In this embodiment, by reading the to-be-retrieved image having a set bit width, the bit width of data inputted to the convolutional layer meets the bit width required by the convolutional layer, thereby implementing the dynamic configuration of the data inputted to the convolutional layer. Each convolutional layer can execute the calculation without processing the inputted data, thereby solving the problems of low calculation precision of fixed-point operation and the influence on the accuracy of the calculation result, and improving the operation precision of the convolutional neural network.

In an example of the foregoing embodiments of the face image retrieval method according to the present disclosure, the convolution calculation configuration information further includes: a convolution kernel size corresponding to each convolutional layer in the convolutional neural network, or a storage address of the to-be-retrieved image.

The to-be-retrieved image is read from the storage address of the to-be-retrieved image in the front-end memory. By configuring an input data bit width and a weight data bit width of the convolutional layer, input data (to-be-retrieved image data) and weight data are read according to the set input data bit width and weight data bit width respectively, and complete input data may be inputted to the convolutional layer through multiple reads. Since the data bit width of read each time corresponds to that of the convolutional layer, the calculation efficiency of the convolutional layer is improved. In addition, the integrity of the input data is ensured, and the inaccuracy of the result due to the missing of the input data resulting from the setting of the input data bit width is avoided.

In an example of the foregoing embodiments of the face image retrieval method according to the present disclosure, the obtaining to-be-retrieved face information corresponding to a to-be-retrieved image by a convolutional neural network includes:

performing convolution calculation on the to-be-retrieved image by a current convolutional layer to obtain a feature map, the current convolutional layer being one of the convolutional layers in the convolutional neural network;

in response to the presence of a next convolutional layer, using the next convolutional layer as the current convolutional layer, using the feature map as the to-be-retrieved image, and iteratively executing following operations until no next convolutional layer exists: the reading the to-be-retrieved image from the front-end memory according to the convolution calculation configuration information configured for the current convolutional layer in the convolutional neural network, and the performing convolution calculation on the to-be-retrieved image by the current convolutional layer to obtain the feature map; and outputting the feature map to obtain the to-be-retrieve face information.

In this embodiment, in order to implement the acceleration of each convolutional layer in the convolutional neural network, by iteration, the next convolutional layer is used as the current convolution layer, the calculation result data calculated by the previous convolutional layer is used as the input data of the next convolutional layer, and the input data and the weight data are also read according to the set input data bit width and weight bit width. In this case, the weight data is the configured weight data corresponding to the convolutional layer. After the feature map is obtained, the feature map is stored in the front-end memory to be read by the next convolutional layer. If there is no next convolutional layer until the convolution computation of the current convolution layer is completed, the currently obtained feature map is outputted as the to-be-retrieved face image obtained by the convolutional neural network.

In an example of the foregoing embodiments of the face image retrieval method according to the present disclosure, in the process of iteratively reading configuration information and executing the convolution calculation, the feature graph is written into the front-end memory after being obtained.

By storing the feature map corresponding to each convolutional layer in the front-end storage, when reading the to-be-retrieved image, the next convolutional layer may directly obtain said image from the front-end memory, thereby facilitating data acquisition and data bit width setting.

In an example of the foregoing embodiments of the face image retrieval method according to the present disclosure, the convolution calculation configuration information further includes an offset address.

The configuring the convolution calculation configuration information for the convolutional neural network further includes:

configuring a storage address of input data corresponding to the next convolutional layer according to the storage address of the input data and the offset address, the input data being to-be-retrieved image data received by the current convolutional layer.

The writing the feature map into the front-end memory includes: writing the feature map to the storage address of the input data corresponding to the next convolutional layer in the front-end memory.

The storage address of the input data corresponding to the next convolutional layer can be obtained by superimposing the offset address to the storage address of the input data. Because in the convolutional neural network, the output data of the previous convolutional layer is the input data of the next convolutional layer, the output data of the previous convolutional layer is processed as the input data of the next convolutional layer and is stored in the storage address of the input data corresponding to the next convolution layer. When the next convolutional layer starts the convolution calculation, there is only a need to perform reading at the corresponding storage address.

Figure 2:
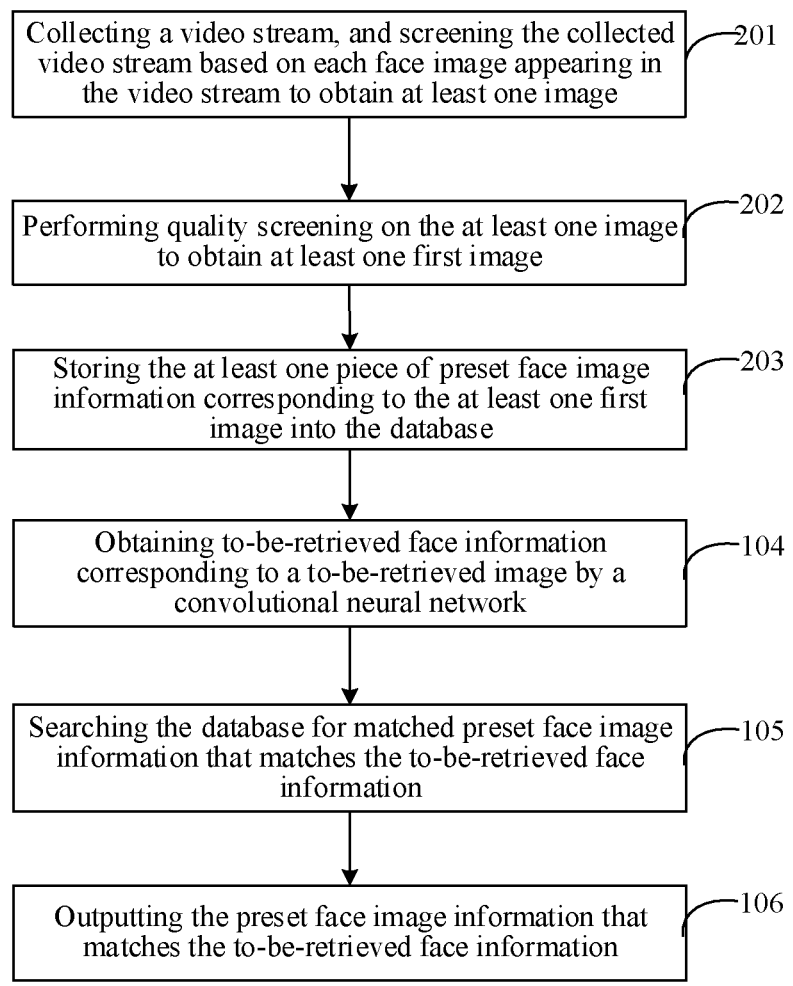
FIG. 2 is a flowchart of another embodiment of a face image retrieval method according to the present disclosure.

FIG. 2 is a flowchart of another embodiment of a face image retrieval method according to the present disclosure. As shown in FIG. 2, the method of this embodiment includes following operations.

At operation 201, a video stream is collected, and the collected video stream is screened based on each face image appearing in the video stream to obtain at least one image.

The image includes face images, and each of the face images corresponds to at least one image. The video stream may be collected in real time by a monitoring device (such as, a camera). Since the font-end storage space is limited, it is not feasible to save the video stream in the front-end database. Therefore, the video stream is decomposed into separate image frames in this operation. Moreover, for the phenomenon that there are a large number of repeated images, meaningless images (no-face images) and blurring in the images obtained based on the video stream, all the images obtained from the video stream are screened to obtain face images including recognizable ones, and at least one image is collected for each face image to ensure that faces appearing in the video will not be missed and can be found more accurately in subsequent recognition.

At operation 202, quality screening is performed on the at least one image to obtain at least one first image.

The at least one first image is an image with face image quality reaching a set threshold. In order to facilitate the recognition of the face in the image obtained in the previous operation, a dedicated Image Signal Processing (ISP) chip is used to perform optimization processing on the original image. The optimization processing here may include operations such as automatic exposure, automatic white balance, and 3D de-noising. In addition, operations such as local exposure and region of interest extraction may also be selected according to the needs of a user. The purpose of executing the optimization processing is to obtain a first image with high definition, low noise, wide dynamic range, low aberration, and low distortion, so as to recognize the face in the image. The set threshold here may be adjusted according to specific situations.

At operation 203, the at least one piece of preset face image information corresponding to the at least one first image is stored into the database.

The at least one piece of face image information is obtained based on the at least one first image obtained through quality screening. In order to implement real-time face retrieval at the front end, it is necessary to establish a database at the front end and store at least one first image with optimized quality and at least one piece of face image information corresponding to at least one first image into the database. The face image information is used for facilitating retrieval, and there is no need to perform no face recognition again in the retrieval process. Moreover, as the front-end storage space is limited, the images and face image information in the database are updated periodically or in real time to ensure sufficient space in the database to store newly collected information.

At operation 104, to-be-retrieved face information corresponding to a to-be-retrieved image is obtained by a convolutional neural network.

The convolutional neural network is configured with corresponding convolution calculation configuration information by a processor. The convolutional neural network includes at least one convolutional layer. The convolution calculation configuration information includes a data bit width value corresponding to each convolutional layer in the convolutional neural network. The to-be-retrieved image includes at least one face region.

At operation 105, a database is searched for matched preset face image information that matches the to-be-retrieved face information.

The database stores at least one piece of preset face image information.

At operation 106, the preset face image information that matches the to-be-retrieved face information is outputted.

In this embodiment, in addition to matching the received to-be-retrieved image with the first image stored in the database, real-time retrieval may also be performed. First, the to-be-retrieved image is received and the to-be-retrieved face information is obtained; when there is no corresponding face image information in the database, a front-end video stream collection apparatus is used to process the newly collected video stream to obtain clear and recognizable preset face image information, that is, the following operations are executed in sequence:

operation 104, operation 201, operation 202, operation 203, operation 105, and operation 106. When the operations are executed according to this order, the retrieved images and preset face image information can be stored into the database, and all images and preset face image information obtained by collection and screening can also be stored into the database. Moreover, in order to combine a server and cloud retrieval in the later stage, the images and information stored into the database need to be uploaded to the server. The server receives the images and information provided by multiple front ends, so that more information can be obtained during retrieval.

In an example of the foregoing embodiments of the face image retrieval method according to the present disclosure, the at least one first image further includes a background image, and the background image is configured to identify a location where the face image appears in the at least one first image.

While obtaining the at least one piece of face image information based on the at least one first image, other information except for the at least one piece of face image information can also be obtained based on the at least one first image. Said other information forms the background information. The background information here can provide the location where the face image appears in the first image, thus obtaining information such as movement trajectory of the person. The first image having the background image plays an auxiliary role in recognizing the place where the person corresponding to the face image appears.

In an example of the foregoing embodiments of the face image retrieval method according to the present disclosure, before the at least one piece of preset face image information corresponding to the at least one first image is stored into the database, the method further includes:

processing the at least one first image by the convolutional neural network to obtain the corresponding at least one piece of preset face image information.

The obtaining the at least one piece of preset face image information and obtaining to-be-processed image information based on a to-be-processed image are implemented by the calculation of a same convolutional neural network. The convolutional neural network in this embodiment is implemented by an FPGA logic part.

Corresponding at least one type of attribute information is obtained based on the at least one piece of preset face image information, and the at least one piece of preset face image information is classified and stored based on the at least one type of attribute information. Each piece of preset face image information includes at least one type of attribute information.

The attribute information involved in this embodiment may include: gender, age, expression, race, whether wearing glasses, whether wearing a mask, and the like. Cases of classification based on these attributes include: gender: male/female; age: juvenile/young/middle-aged/old-aged; expression: happy/sad/angry/calm etc.; race: yellow/black/white/brown; whether wearing glasses: yes/no; whether wearing a mask: yes/no. If all the aforementioned attributes are combined to classify the image, one label may be obtained based on each attribute. In this case, each image corresponds to multiple labels, for example, one image includes one middle-aged yellow woman who wears glasses but does not wear a mask and whose expression is calm. In the classification process, the first image and the face image information having the same label can be stored in one position.

In an example of the foregoing embodiments of the face image retrieval method according to the present disclosure, the obtaining corresponding at least one type of attribute information based on the at least one piece of preset face image information, and classifying and storing the at least one piece of preset face image information based on the at least one type of attribute information includes:

receiving inputted at least one first image with image quality exceeding the set threshold and at least one piece of relevant information corresponding to the at least one first image; and establishing the corresponding at least one type of attribute information for the at least one first image based on the at least one piece of relevant information, and storing the at least one piece of preset face image information corresponding to the at least one first image into the database based on the at least one type of attribute information.

This embodiment essentially provides a registration process. In the registration process, one first image and corresponding relevant information used for recognizing the first image are inputted. Generally, the relevant information here refers to name information of the user, etc. Moreover, the image is recognized to obtain the corresponding face image information; after the preset face image information and the inputted first image are stored into the database, and during later image retrieval, the relevant information corresponding to the face image can be obtained directly if the first image is obtained by retrieval.

In an example of the foregoing embodiments of the face image retrieval method according to the present disclosure, storing the preset face image information corresponding to the first image into the database based on the attribute information includes:

storing all preset face image information having same attribute information in the at least one piece of preset face image information into one data item, and establishing an index for the data item in the database based on the attribute information.

The method according to this embodiment further includes:

obtaining a collection time value of collecting each image, and sequentially storing the data items into the database according to the collection time values.

All the preset face image information is distinguished and stored into the database, and all the preset face image information having same attribute information is stored into one data item so as to obtain the corresponding preset face image information by retrieval. When screening the image, the collection time value of the image is obtained in the video stream. After the time value is obtained, data items can be sorted according to the collection time values corresponding to the preset face image information updated and stored therein for storage. After sorting, it is convenient to first obtain the latest image meeting conditions in the retrieval process. The number and time of appearances of a certain person in the current place are given according to the collection time values, to avoid image confusion of the same person appearing in the same scene multiple times, thereby playing an auxiliary role in helping the police search for criminal evidence of criminal offenders.

In an example of the foregoing embodiments of the face image retrieval method according to the present disclosure, the storing the preset face image information corresponding to the first image into the database includes:

searching, based on attribute information corresponding to the first image, the database for determining whether a corresponding data item exists;

when a data item corresponding to the attribute information exists in the database, storing the preset face image information into the corresponding data item; and when no data item corresponding to the attribute information exists in the database, creating a new data item for the attribute information, and storing the preset face image information into the new data item.

This embodiment provides an example for the storage of one first image. Before the storage, the database is searched according to the obtained attribute information for data items. If there are existing data items, the information stored into the corresponding data items; if there is no existing data item, a new data item is established and the information is stored therein, so as to ensure that the attribute information of the preset face image information stored in each data item is the same.

In another embodiment of the face image retrieval method according to the present disclosure, on the basis of the foregoing embodiments, the screening the collected video stream based on each face image appearing in the video stream to obtain at least one image includes:

decomposing the collected video stream into at least one decomposed image, and optimizing the at least one decomposed image to obtain an intermediate image with optimized image display effect; and performing face recognition on all the intermediate images based on the convolutional neural network, and obtaining the at least one image having a face image by screening based on a result of the face recognition.

The decomposition of the collected video stream may be implemented in many ways, which are not limited in this embodiment. The display effect of the obtained decomposed image is optimized to obtain the intermediate image with optimized image display effect, face recognition is performed on the intermediate image based on the convolutional neural network to obtain the image having the face image, and other useless images having no face image are deleted by screening, thereby improving the reliable image foundation for the later face recognition.

In an example of the foregoing embodiments of the face image retrieval method according to the present disclosure, the method further includes: performing face recognition based on the convolutional neural network to obtain preset face recognition information, and evaluating the quality of the face image in the at least one image through the preset face recognition information.

In this embodiment, the face recognition information is obtained through a face quality evaluation algorithm. The face recognition information may include face yaw angle, pitch angle, and/or face size. That is, the face image quality is comprehensively evaluated based on the face yaw angle, pitch angle, and face size; the captured face is scored, the score obtained is compared with a preset score value, the first image having a score of lower than the preset score value is deleted, and only the first image having a score higher than the preset score value is retained. The quality screening ensures that the images stored into the database all have face images with high recognition, thereby reducing the occupancy rate of useless information and improving the transmission efficiency. The images can also be sorted based on the face image quality, thereby further avoiding repeated upload of multiple clear images of the same person, and also avoiding missing of upload of relatively unclear face images.

In an example of the foregoing embodiments of the face image retrieval method according to the present disclosure, the performing quality screening on the at least one image to obtain at least one first image includes:

performing quality screening on the face image in the at least one image based on the preset face recognition information corresponding to the at least one image, and storing the image with face image quality reaching the preset threshold as the first image.

The at least one image is screened based on the face image quality, only the images with face image quality reaching the preset threshold are retained, and other images with face image quality not reaching the preset threshold are discarded, so as to ensure that face matching can be quickly implemented for all the face images in the first image in the retrieval process.

In an example of the foregoing embodiments of the face image retrieval method according to the present disclosure, the searching a database for matched preset face image information that matches the to-be-retrieved face information includes:

obtaining the attribute information corresponding to the to-be-retrieved image based on the to-be-retrieved face information, and searching, based on the attribute information, the database for determining whether a conformed data item exists;

when a data item conforming to the attribute information exists, obtaining the matched preset face image information from the conformed data item; and when no data item conforming to the attribute information exists, feeding back information indicating that no match result information exists.

Since the data items are set in the foregoing embodiments, in this embodiment, by first retrieving the data items conforming to the attribute information, the conformed data items are further searched for the preset face image information of the accompanying drawings. By this retrieval mode, the retrieval efficiency may be effectively improved, thereby avoiding a large amount of meaningless work generated by the direct matching of the preset face image information.

In an example of the foregoing embodiments of the face image retrieval method according to the present disclosure, the performing quality screening on the at least one image to obtain at least one first image includes:

performing automatic exposure, automatic white balance, and 3D de-noise processing on the at least one image to obtain the at least one first image with display effect being optimized.

In this embodiment, the collected image is inputted into an Image Signal Processing (ISP) module, and the ISP module automatically implements automatic exposure, automatic white balance, and 3D de-noise processing. It is also possible to choose to add operation such as local exposure and/or region of interest extraction according to the needs of the user. The purpose of executing the optimization processing is to obtain a first image with high definition, low noise, wide dynamic range, low aberration, and low distortion, so as to recognize the face in the image.

In this embodiment, direct current power supply or Power Over Ethernet (PoE) 802.3af are proposed, where the direct current power supply is prioritized over the POE.

A person of ordinary skill in the art may understand that: all or some operations of implementing the forgoing embodiments of the method may be achieved by a program by instructing related hardware; the foregoing program may be stored in a computer-readable storage medium; when the program is executed, operations including the foregoing embodiments of the method are performed; moreover, the foregoing storage medium includes various media capable of storing program codes such as an Read-Only Memory (ROM), a Random Access Memory (RAM), a magnetic disk, or an optical disk.

Exemplarily, the flow of the face image retrieval method is as follows:

1. a photographing apparatus collects a video stream, and obtains at least one image on which a face image is displayed from the video stream by screening; 2. the photographing apparatus determines, from the at least one image, at least one first image with face image quality of reaching a set threshold; 3. the photographing apparatus processes the at least one first image by a convolutional neural network to obtain at least one piece of preset facial image information; 4. the photographing apparatus obtains at least one piece of relevant information of the at least one first image; 5. the photographing apparatus establishes at least one piece of attribute information corresponding to the at least one first image based on the at least one piece of related information; 6. the photographing apparatus stores the preset face image information having same attribute information into one data item in a database, so as to roughly store the at least one piece of preset face image information into the database based on the at least one piece of attribute information; 7. when the photographing apparatus reads a to-be-retrieved image from a front-end memory, the photographing apparatus performs convolution calculation on the to-be-retrieved image by a current convolutional layer to obtain a feature map; 8. the photographing apparatus stores the feature map in the front-end memory as the to-be-retrieved image of the next convolutional layer, for the convolution calculation of the feature map by the next convolutional layer; 9. iterative execution is performed in this way until no next convolutional layer exists, and the photographing apparatus determines the finally outputted feature map as the to-be-retrieved face information; 10. the photographing apparatus matches the to-be-retrieved face information with the at least one preset face image in the database; and 11. the photographing apparatus outputs a preset face image that matches the to-be-retrieved face information, thereby completing the process of face image retrieval.

Figure 3:
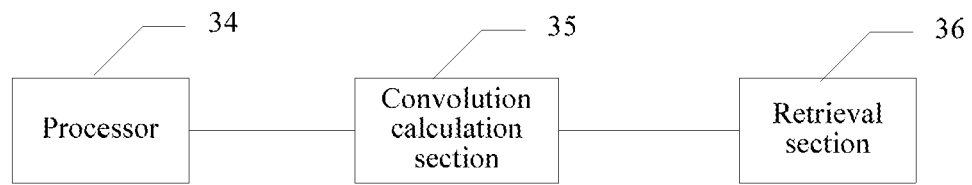
FIG. 3 is a schematic structural diagram of an embodiment of a face image retrieval apparatus according to the present disclosure.

FIG. 3 is a schematic structural diagram of an embodiment of a photographing apparatus according to the present disclosure. The apparatus of this embodiment may be configured to implement the foregoing method embodiments of the present disclosure. As shown in FIG. 3, the apparatus of this embodiment includes:

a processor 34, configured to configure corresponding convolution calculation configuration information for a convolutional neural network, where the convolutional neural network includes at least one convolutional layer, and the convolution calculation configuration information includes a data bit width value corresponding to each convolutional layer in the convolutional neural network;

a convolution calculation section 35, configured to obtain to-be-retrieved face information corresponding to a to-be-retrieved image by the convolutional neural network, where the to-be-retrieved image includes at least one face region, and a retrieval section 36, configured to search a database for matched preset face image information that matches the to-be-retrieved face information, the database storing at least one piece of preset face image information, and to output the preset face image information that matches the to-be-retrieved face information.

Based on the face image retrieval apparatus provided by the foregoing embodiments of the present disclosure, and based on the face image retrieval method provided by the foregoing embodiments of the present disclosure, to-be-retrieved face information corresponding to a to-be-retrieved image is obtained by a convolutional neural network; the convolutional neural network is configured with corresponding convolution calculation configuration information by a processor; because the convolutional neural network is configured with convolution calculation configuration information, bit widths of images inputted to all convolutional layers in the convolutional neural network correspond to the convolutional layers, thus reducing the amount of calculation of face recognition based on the convolutional neural network and improving the processing efficiency of the convolutional layers; moreover, the to-be-retrieved face information can be quickly and accurately obtained from the inputted to-be-retrieved images, thus solving the problems of low calculation accuracy of fixed-point operation and the influence on the accuracy of the calculation result, and improving the operational precision of the convolutional neural network; a database is searched for matched preset face image information that matches the to-be-retrieved face information; and the preset face image information that matches the to-be-retrieved face information is outputted. By searching the database set in the photographing apparatus for the matched preset face image information, the effect of real-time face retrieval is achieved, and the efficiency of face image retrieval is improved.

According to another embodiment of the photographing apparatus of the present disclosure, based on the foregoing embodiments, the convolution calculation section 35 includes: a configurable read controller and an image processing section;

the configurable read controller is configured to read the to-be-retrieved image from a front-end memory according to the convolution calculation configuration information, the bit width of the to-be-retrieved image being equal to the data bit width value; and the image processing section is configured to perform convolution calculation on the to-be-retrieved image by the convolutional neural network to obtain the to-be-retrieved face information.

In this embodiment, by reading the to-be-retrieved image having a set bit width, the bit width of data inputted to the convolutional layer meets the bit width required by the convolutional layer, thereby implementing the dynamic configuration of the data inputted to the convolutional layer. Each convolutional layer can execute the calculation without processing the inputted data, thereby solving the problems of low calculation precision of fixed-point operation and the influence on the accuracy of the calculation result, and improving the operation precision of the convolutional neural network.

In an example of the foregoing embodiments of the photographing apparatus according to the present disclosure, the convolution calculation configuration information further includes: a convolution kernel size corresponding to each convolutional layer in the convolutional neural network, or a storage address of the to-be-retrieved image, where the to-be-retrieved image is read from the storage address of the to-be-retrieved image in the front-end memory.

In an example of the foregoing embodiments of the photographing apparatus according to the present disclosure, the image processing section includes: a layer calculation section and an iteration section;

the layer calculation section is configured to perform convolution calculation on the to-be-retrieved image by a current convolutional layer to obtain a feature map, the current convolutional layer being one of the convolutional layers in the convolutional neural network;

the iteration section is configured to: in response to the presence of a next convolutional layer, use the next convolutional layer as the current convolutional layer, use the feature map as the to-be-retrieved image, and iteratively execute following operations until no next convolutional layer exists: the reading the to-be-retrieved image from the front-end memory according to the convolution calculation configuration information configured for the current convolutional layer in the convolutional neural network, and the performing convolution calculation on the to-be-retrieved image by the current convolutional layer to obtain the feature map; and to output the feature map to obtain the to-be-retrieve face information.

In an example of the foregoing embodiments of the photographing apparatus according to the present disclosure, the apparatus further includes: a configurable write-back controller;

the configurable write-back controller is configured to write the feature map into the front-end memory.

In an example of the foregoing embodiments of the photographing apparatus according to the present disclosure, the convolution calculation configuration information further includes an offset address.

The processor is configured to configure a storage address of input data corresponding to the next convolutional layer according to the storage address of input data corresponding to the current convolutional layer and the offset address; and the configurable write-back controller is configured to write the feature map into the storage address of the input data corresponding to the next convolutional layer in the front-end memory.

Figure 4:
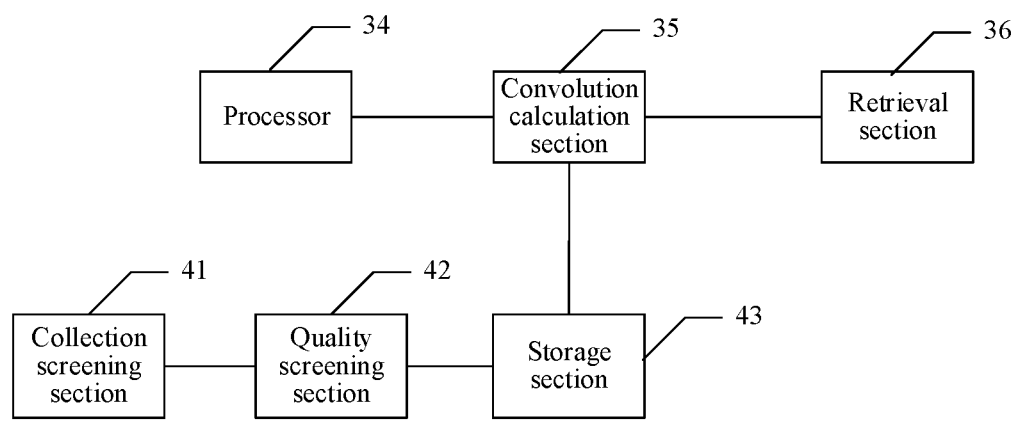
FIG. 4 is a schematic structural diagram of another embodiment of a face image retrieval apparatus according to the present disclosure.

FIG. 4 is a schematic structural diagram of another embodiment of a photographing apparatus according to the present disclosure. As shown in FIG. 4, the apparatus in this embodiment includes: a collection screening section, a quality screening section, and a storage section;

the collection screening section 41 is configured to collect a video stream, and screen the collected video stream based on each face image appearing in the video stream to obtain at least one image, where the image includes face images, and each of the face images corresponds to at least one image.

The quality screening section 42 is configured to perform quality screening on the at least one image to obtain at least one first image. The at least one first image is an image with face image quality reaching a set threshold, and each of the at least one first image includes one face image.

The storage section 43 is configured to store the at least one piece of preset face image information corresponding to the at least one first image into the database.

The processor 34 is configured to configure corresponding convolution calculation configuration information for a convolutional neural network.

The convolutional neural network includes at least one convolutional layer, and the convolution calculation configuration information includes a data bit width value corresponding to each convolutional layer in the convolutional neural network.

The convolution calculation section 35 is configured to obtain to-be-retrieved face information corresponding to a to-be-retrieved image by the convolutional neural network.

The to-be-retrieved image includes at least one face region.

The retrieval section 36 is configured to search a database for matched preset face image information that matches the to-be-retrieved face information, the database storing at least one piece of preset face image information, and to output the preset face image information that matches the to-be-retrieved face information.

In this embodiment, in addition to matching the received to-be-retrieved image with the first image stored into the database, real-time retrieval may also be performed. First, the to-be-retrieved image is received and the to-be-retrieved face information is obtained; when there is no corresponding face image information in the database, a front-end video stream collection apparatus is used to process the newly collected video stream to obtain clear and recognizable preset face image information.

In an example of the foregoing embodiments of the photographing apparatus according to the present disclosure, the image obtained by screening based on the collected video stream further includes a background image, and the background image is configured to identify a location where the face image appears in the at least one first image.

In an example of the foregoing embodiments of the photographing apparatus according to the present disclosure, the convolution configuration section 35 is configured to: process the at least one first image by the convolutional neural network to obtain the corresponding at least one piece of preset face image information; and obtain corresponding at least one type of attribute information based on the at least one piece of preset face image information, and classify and store the at least one piece of preset face image information based on the at least one type of attribute information. Each piece of preset face image information includes at least one type of attribute information.

In an example of the foregoing embodiments of the photographing apparatus according to the present disclosure, the apparatus further includes: an information receiving section and a classifying section;

the information receiving section is configured to receive an inputted first image with image quality exceeding the set threshold and relevant information corresponding to the first image; and the classifying section is configured to establish the corresponding at least one type of attribute information for the at least one first image based on the at least one piece of relevant information, and store the at least one piece of preset face image information corresponding to the at least one first image into the database based on the at least one type of attribute information.

In an example of the foregoing embodiments of the photographing apparatus according to the present disclosure, the classifying section is configured to store all preset face image information having same attribute information in the at least one piece of preset face image information into one data item, and establish an index for the data item in the database based on the attribute information.

The photographing apparatus in this embodiment further includes: a time-based sorting section; and the time-based sorting section is configured to obtain a collection time value of collecting each image, and sequentially store the data items into the database according to the collection time values.

In an example of the foregoing embodiments of the photographing apparatus according to the present disclosure, the storage section 43 includes: a search section and an attribute storage section;

the search section is configured to search, based on attribute information corresponding to the first image, the database for determining whether a corresponding data item exists; and the attribute storage section is configured to: when a data item corresponding to the attribute information exists in the database, store the preset face image information into the corresponding data item; when if no data item corresponding to the attribute information exists in the database, create a new data item for the attribute information, and store the preset face image information into the new data item.

In another embodiment of the photographing apparatus according to the present disclosure, based on the foregoing embodiments, the collection screening section 41 further includes: a decomposition section and a recognition screening section;

the decomposition section is configured to decompose the collected video stream into at least one decomposed image, and optimize the at least one decomposed image to obtain an intermediate image with optimized image display effect; and the recognition screening section is configured to perform face recognition on all the intermediate images based on the convolutional neural network, and obtain the at least one image having a face image by screening based on a result of the face recognition.

The decomposition of the collected video stream may be implemented in many ways, which are not limited in this embodiment. The display effect of the obtained decomposed image is optimized to obtain the intermediate image with optimized image display effect, face recognition is performed on the intermediate image based on the convolutional neural network to obtain the image having the face image, and other useless images having no face image are deleted by screening, thereby improving the reliable image foundation for the later face recognition.

In an example of the foregoing embodiments of the photographing apparatus according to the present disclosure, the collection screening section 41 further includes: an evaluation subsection; and the evaluation subsection is configured to perform face recognition based on the convolutional neural network to obtain preset face recognition information, and evaluate the quality of the face image in the at least one image through the preset face recognition information.

In an example of the foregoing embodiments of the photographing apparatus according to the present disclosure, the quality screening section 42 is configured to perform quality screening on the face image in the at least one image based on the preset face recognition information corresponding to the at least one image, and store the image with face image quality reaching the preset threshold as the at least one first image.

In an example of the foregoing embodiments of the photographing apparatus according to the present disclosure, the retrieval section 36 includes: an attribute search subsection and a data matching subsection;

the attribute search subsection is configured to obtain the attribute information corresponding to the to-be-retrieved image based on the to-be-retrieved face information, and search, based on the attribute information, the database for determining whether a conformed data entry exists; and the data matching subsection is configured to: when a data item conforming to the attribute information exists, obtain the matched preset face image information from the conformed data item; and when no data item conforming to the attribute information exists, feed back information indicating that no match result exists.

In an example of the foregoing embodiments of the photographing apparatus according to the present disclosure, the quality screening section 42 is configured to perform automatic exposure, automatic white balance, and 3D denoise processing on the at least one image to obtain the at least one first image with display effect being optimized.

In another embodiment of the photographing apparatus according to the present disclosure, the database includes a blacklist sublibrary and a whitelist sublibrary, the blacklist sublibrary includes at least one piece of preset face image information, and the whitelist sublibrary includes at least one piece of preset face image information.

The photographing apparatus in this embodiment further includes: a feedback section; and the feedback section is configured to feed back warning information when the matched preset face image information belongs to the blacklist sublibrary, and feed back normal information when the matched preset face image belongs to the whitelist sublibrary.

During specific implementation, the photographing apparatus in this embodiment can act as an electronic police to help the police search for criminals. The face information of the criminals are deployed into the front-end capture machine (photographing apparatus) via a network; the photographing apparatus performs 24-hour monitoring; once the matched face image information in a blacklist database is retrieved, the feedback unit feeds back the warning information to immediately notify the police, thus breaking through the drawbacks of manual monitoring, and achieving real-time monitoring and timely notification.

Figure 5:
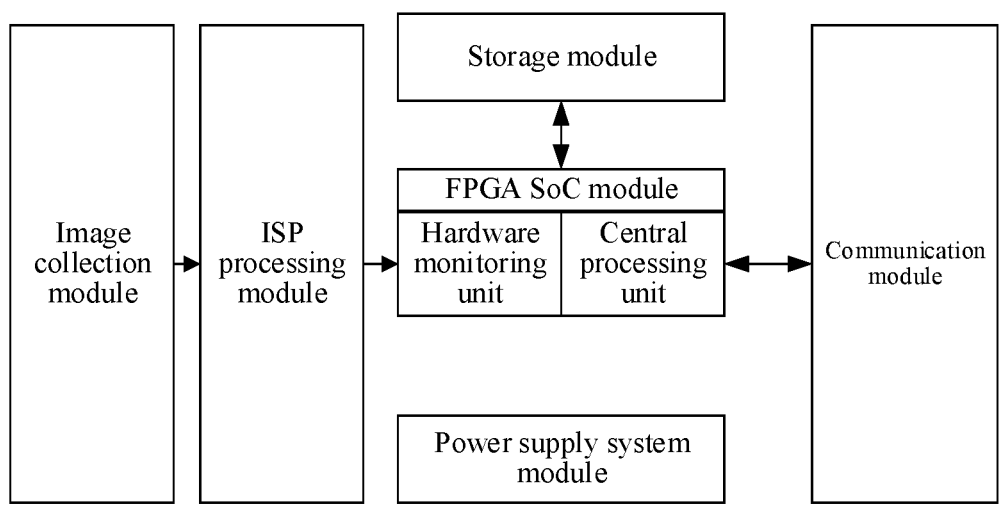
FIG. 5 is a schematic structural diagram of an example of the foregoing embodiments of a photographing apparatus according to the preset disclosure.

FIG. 5 is a schematic structural diagram of an example of the foregoing embodiments of a photographing apparatus according to the preset disclosure. As shown in FIG. 5, the apparatus of this embodiment includes:

an image collection module (equivalent to the collection screening section 41 of the present disclosure), configured to collect a video stream, and screen the collected video stream based on each face image appearing in the video stream to obtain at least one image;

an ISP processing module (equivalent to the quality screening section 42 of the present disclosure), configured to perform quality screening on all images to obtain a first image with face image quality reaching a set threshold; and a storage module (equivalent to the database of the present disclosure), configured to store preset face image information corresponding to the first image.

An FPGA SoC module includes a hardware monitoring unit (equivalent to the convolution calculation section 35 of the present disclosure) and a central processing unit (corresponding to the processor 34 of the present disclosure); the hardware monitoring unit implements obtaining of to-be-retrieved face information corresponding to an to-be-retrieved image through a convolutional neural network; the central processing unit is configured to configure corresponding convolution calculation configuration information for the convolutional neural network. In this embodiment, the hardware monitoring unit and the central processing unit are integrated on one monocrystalline silicon wafer through the FPGA SoC module, so that communication between the two is not limited by bandwidth, and configuration and convolution operation are implemented by one module, so that real-time face recognition is implemented.

A communication module (equivalent to the feedback section of the present disclosure) is provided. Through the communication module, the obtained matched preset face image information can be sent out, and moreover, corresponding information can be sent to a preset client according to a whitelist or blacklist to which the preset face image information belongs.

This embodiment may further include: a power supply system module. In order to achieve independent operation of the photographing apparatus, the power supply system module is provided, which supplies power for all of the foregoing modules.

Figure 6:
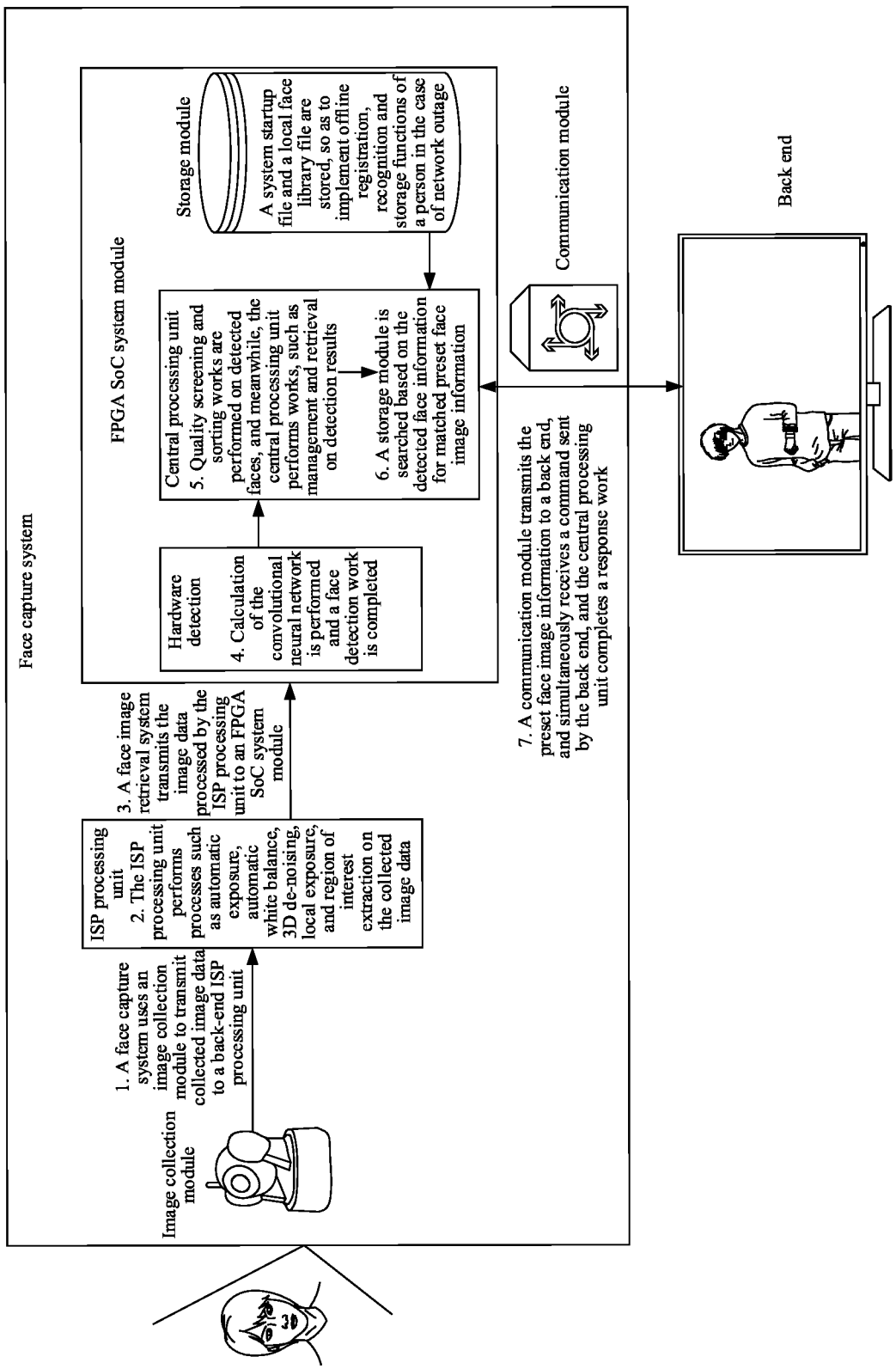
FIG. 6 is a schematic structural diagram of an example of the foregoing embodiments of a photographing apparatus according to the present disclosure.

Exemplarily, as shown in FIG. 6, the flow of the face image retrieval method is as follows:

1. a face capture system uses an image collection module to transmit collected image data to a back-end ISP processing unit; 2. the ISP processing unit performs processes such as automatic exposure, automatic white balance, 3D de-noising, local exposure, and region of interest extraction on the collected image data; 3. a face image retrieval system transmits the image data processed by the ISP processing unit to an FPGA SoC system module; 4. hardware detection of the FPGA SoC system module performs calculation of the convolutional neural network and completes a face detection work; 5. a central processing unit of the FPGA SoC system module performs quality screening and sorting works on detected faces, and meanwhile, the central processing unit performs works, such as management and retrieval on detection results; 6. the central processing unit of the FPGA SoC system module searches for matched preset face image information from a storage module based on the detected face information, where the storage module is configured to store a system startup file and a local face library file, so as to implement offline registration, recognition and storage functions of a person in the case of network outage; 7. a communication module transmits the preset face image information to a back end, and simultaneously receives a command sent by the back end, and the central processing unit completes a response work.

According to another aspect of this embodiment, provided is an electronic device, which is provided with the photographing apparatus according to any one of the foregoing embodiments of the present disclosure.

According to another aspect of this embodiment, provided is a computer storage medium, which is configured to store computer-readable instructions, where when the instructions are executed, the operations of any one of the foregoing embodiments of the face image retrieval method according to the present disclosure are executed.

Figure 7:
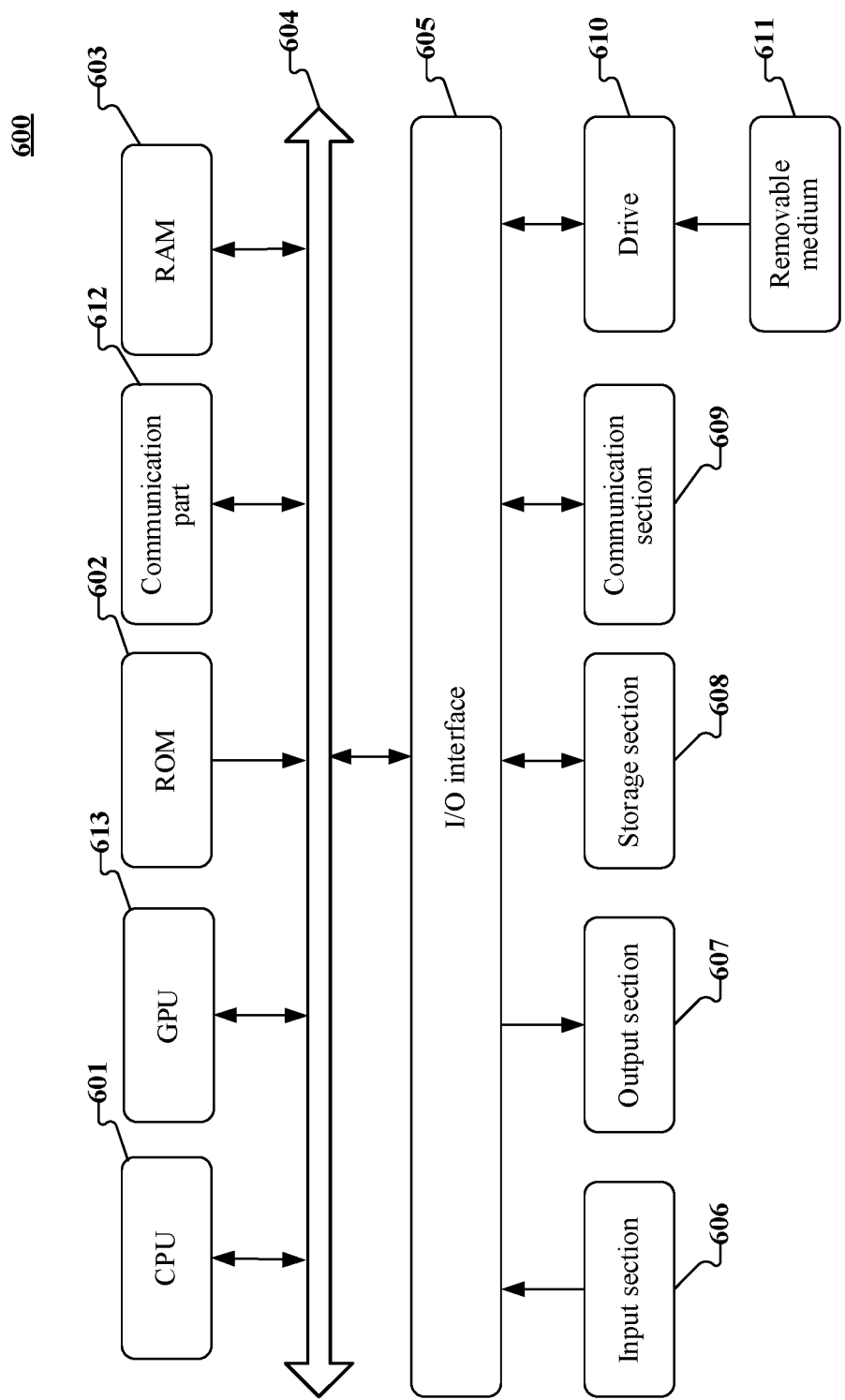
FIG. 7 is a schematic structural diagram of an electronic device 600 suitable for implementing a terminal device or a server according to the embodiments.

This embodiment further provides an electronic device, which, for example, may be a mobile terminal, a Personal Computer (PC), a tablet computer, a server, and the like. Referring to FIG. 7 below, a schematic structural diagram of an electronic device 600, which may be a terminal device or a server, suitable for implementing an embodiment of the present application is shown. As shown in FIG. 7, the computer system 600 includes one or more processors, a communication part, and the like. The one or more processors are, for example, one or more Central Processing Units (CPUs) 601 and/or one or more Graphic Processing Units (GPUs) 613, and may execute appropriate actions and processing according to executable instructions stored in a Read-Only Memory (ROM) 602 or executable instructions loaded from a storage section 608 to a Random Access Memory (RAM) 603. The communication part 612 may include, but is not limited to, a network card. The network card may include, but is not limited to, an Infiniband (IB) network card. The processor may communicate with the ROM 602 and/or the RAM 630, to execute executable instructions. The processor is connected to the communication part 612 via a bus 604, and communicates with other target devices via the communication part 612, thereby implementing corresponding operations of any method provided in the embodiments of the present application, for example, obtaining to-be-retrieved face information corresponding to a to-be-retrieved image by a convolutional neural network, the convolutional neural network being configured with corresponding convolution calculation configuration information by a processor, the convolutional neural network including at least one convolutional layer, the convolution calculation configuration information including a data bit width value corresponding to each convolutional layer in the convolutional neural network, and the to-be-retrieved image including at least one face region; searching a database for preset face image information that matches the to-be-retrieved face information, the database storing at least one piece of preset face image information; and outputting the preset face image information that matches the to-be-retrieved face information.

In addition, the RAM 603 further stores various programs and data required for operations of an apparatus. The CPU 601, the ROM 602, and the RAM 603 are connected to each other by the bus 604. In the presence of the RAM 603, the ROM 602 is an optional module. The RAM 603 stores executable instructions, or writes the executable instructions into the ROM 602 during running, where the executable instructions cause the processor 601 to execute corresponding operations of the foregoing communication method. An Input/Output (I/O) interface 605 is also connected to the bus 604. The communication part 612 is integrated, or is configured to have multiple sub-modules (for example, multiple IB network cards) connected to the bus.

The following components are connected to the I/O interface 605: an input section 606 including a keyboard, a mouse and the like; an output section 607 including a Cathode-Ray Tube (CRT), a Liquid Crystal Display (LCD), a speaker and the like; a storage section 608 including a hard disk and the like; and a communication section 609 of a network interface card including an LAN card, a modem and the like. The communication section 609 performs communication processing via a network such as the Internet. A drive 610 is also connected to the I/O interface 605 according to requirements. A removable medium 611 such as a magnetic disk, an optical disk, a magneto-optical disk, a semiconductor memory or the like is mounted on the drive 610 according to requirements, so that a computer program read from the removable medium is installed on the storage section 608 according to requirements.

It should be noted that the architecture illustrated in FIG. 7 is merely an optional implementation mode. During specific practice, the number and types of the components in FIG. 7 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of this disclosure.

Particularly, a process described above with reference to a flowchart according to the embodiments of the present disclosure is implemented as a computer software program. For example, the embodiments of the present application include a computer program product, which includes a computer program tangibly included in a machine-readable medium. The computer program includes a program code for performing the method shown in the flowchart. The program code may include instructions for performing the operations of the method provided in the embodiments of the present application, for example, obtaining to-be-retrieved face information corresponding to a to-be-retrieved image by a convolutional neural network, the convolutional neural network being configured with corresponding convolution calculation configuration information by a processor, the convolutional neural network including at least one convolutional layer, the convolution calculation configuration information including a data bit width value corresponding to each convolutional layer in the convolutional neural network, and the to-be-retrieved image including at least one face region; searching a database for preset face image information that matches the to-be-retrieved face information, the database storing at least one piece of preset face image information; and outputting the preset face image information that matches the to-be-retrieved face information. In such embodiments, the computer program is downloaded and installed from the network through the communication section 609, and/or is installed from the removable medium 611. The computer program, when being executed by the CPU 601, executes the foregoing functions defined in the methods of the present application.

The methods, apparatuses, and devices in the present disclosure are implemented in many manners. For example, the methods, apparatuses, and devices of the present disclosure may be implemented with software, hardware, firmware, or any combination of software, hardware, and firmware. The foregoing sequence of operations of the method is merely for description, and unless otherwise stated particularly, is not intended to limit the operations of the method in the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

INDUSTRIAL APPLICABILITY

To-be-retrieved face information corresponding to a to-be-retrieved image is obtained by a convolutional neural network; the convolutional neural network is configured with corresponding convolution calculation configuration information by a processor; because the convolutional neural network is configured with the convolution calculation configuration information, bit widths of images inputted to all convolutional layers in the convolutional neural network correspond to the convolutional layers, thus reducing the amount of calculation of face recognition based on the convolutional neural network and improving the processing efficiency of the convolutional layers; moreover, the to-be-retrieved face information can be quickly and accurately obtained from the inputted to-be-retrieved images, thus solving the problems of low calculation accuracy of fixed-point operation and the influence on the accuracy of the calculation result, and improving the operational precision of the convolutional neural network; a database is searched for preset face image information that matches the to-be-retrieved face information; and the preset face image information that matches the to-be-retrieved face information is outputted. By searching the database set in the photographing apparatus for the matched preset face image information, the effect of real-time face retrieval is achieved, and the efficiency of face image retrieval is improved.

The invention claimed is:

1. A face image retrieval method, applied to a photographing apparatus, the method comprising:
   obtaining to-be-retrieved face information corresponding to a to-be-retrieved image by a convolutional neural network, the convolutional neural network being configured with corresponding convolution calculation configuration information by a processor, the convolutional neural network comprising at least one convolutional layer, the convolution calculation configuration information comprising a data bit width value corresponding to each convolutional layer in the convolutional neural network, and the to-be-retrieved image comprising at least one face region;
   searching a database for matched preset face image information that matches the to-be-retrieved face information, the database storing at least one piece of preset face image information; and
   outputting the preset face image information that matches the to-be-retrieved face information;

wherein the obtaining to-be-retrieved face information corresponding to a to-be-retrieved image by a convolutional neural network comprises:
   reading the to-be-retrieved image from a front-end memory according to the convolution calculation configuration information, a bit width of the to-be-retrieved image being equal to the data bit width value; and
   performing convolution calculation on the to-be-retrieved image by the convolutional neural network to obtain the to-be-retrieved face information.

2. The method according to claim 1, wherein the convolution calculation configuration information further comprises: a convolution kernel size corresponding to each convolutional layer in the convolutional neural network, or a storage address of the to-be-retrieved image, wherein the to-be-retrieved image is read from the storage address of the to-be-retrieved image in the front-end memory.

3. The method according to claim 2, wherein the performing convolution calculation on the to-be-retrieved image by the convolutional neural network to obtain the to-be-retrieved face information comprises:
   performing convolution calculation on the to-be-retrieved image by a current convolutional layer to obtain a feature map, the current convolutional layer being one of the convolutional layers in the convolutional neural network;
   in response to the presence of a next convolutional layer, using the next convolutional layer as the current convolutional layer, using the feature map as the to-be-retrieved image, and iteratively executing following operations until no next convolutional layer exists: the reading the to-be-retrieved image from the front-end memory according to the convolution calculation configuration information configured for the current convolutional layer in the convolutional neural network, and the performing convolution calculation on the to-be-retrieved image by the current convolutional layer to obtain the feature map; and
   outputting the feature map to obtain the to-be-retrieve face information.

4. The method according to claim 3, further comprising: after obtaining the feature map,
   writing the feature map into the front-end memory.

5. The method according to claim 4, wherein the convolution calculation configuration information further comprises an offset address, wherein the method further comprises: after the performing convolution calculation on the to-be-retrieved image by the current convolutional layer to obtain the feature map,
   configuring a storage address of input data corresponding to the next convolutional layer according to the storage address of the input data and the offset address, the input data being to-be-retrieved image data received by the current convolutional layer; and
   correspondingly, the writing the feature map into the front-end memory comprises:
   writing the feature map into the storage address of the input data corresponding to the next convolutional layer in the front-end memory.

6. The method according to claim 1, further comprising: before the searching a database for matched preset face image information that matches the to-be-retrieved face information, the method further comprises:
   collecting a video stream, and screening the collected video stream based on each face image appearing in the video stream to obtain at least one image, wherein the image comprises face images, and each of the face images corresponds to at least one image;

performing quality screening on the at least one image to obtain at least one first image, the at least one first image being an image with face image quality reaching a set threshold, and each of the at least one first image comprising one face image; and storing the at least one piece of preset face image information corresponding to the at least one first image into the database.

7. The method according to claim 6, wherein the at least one first image further comprises a background image, and the background image is configured to identify a location where the face image appears in the at least one first image.

8. The method according to claim 6, further comprising: before the storing the at least one piece of preset face image information corresponding to the at least one first image into the database, processing the at least one first image by the convolutional neural network to obtain the corresponding at least one piece of preset face image information; and obtaining corresponding at least one type of attribute information based on the at least one piece of preset face image information, and classifying and storing the at least one piece of preset face image information based on the at least one type of attribute information, each piece of preset face image information comprising at least one type of attribute information.

9. The method according to claim 8, wherein the obtaining corresponding at least one type of attribute information based on the at least one piece of preset face image information, and classifying and storing the at least one piece of preset face image information based on the at least one type of attribute information comprises:

receiving inputted at least one first image with image quality exceeding the set threshold and at least one piece of relevant information corresponding to the at least one first image; and establishing the corresponding at least one type of attribute information for the at least one first image based on the at least one piece of relevant information, and storing the at least one piece of preset face image information corresponding to the at least one first image into the database based on the at least one type of attribute information.

10. The method according to claim 9, wherein the storing the at least one piece of preset face image information corresponding to the at least one first image into the database based on the at least one type of attribute information comprises:

storing all preset face image information having same attribute information in the at least one piece of preset face image information into one data item, and establishing an index for the data item in the database based on the attribute information; and the method further comprises:

obtaining a collection time value of collecting each image, and sequentially storing the data items into the database according to the collection time values.

11. The method according to claim 10, wherein storing the preset face image information corresponding to the first image into the database comprises:

searching, based on attribute information corresponding to the first image, the database for determining whether a corresponding data item exists; and when a data item corresponding to the attribute information exists in the database, storing the preset face image information into the corresponding data item; and when no data item corresponding to the attribute information exists in the database, creating a new data item for the attribute information, and storing the preset face image information into the new data item.

12. The method according to claim 10, wherein the searching a database for matched preset face image information that matches the to-be-retrieved face information comprises:

obtaining the attribute information corresponding to the to-be-retrieved image based on the to-be-retrieved face information, and searching, based on the attribute information, the database for determining whether a conformed data item exists;

when a data item conforming to the attribute information exists, obtaining the matched preset face image information from the conformed data item; and when no data item conforming to the attribute information exists, feeding back information indicating that no match result exists.

13. The method according to claim 6, wherein the screening the collected video stream based on each face image appearing in the video stream to obtain at least one image comprises:

decomposing the collected video stream into at least one decomposed image, and optimizing the at least one decomposed image to obtain an intermediate image with optimized image display effect; and performing face recognition on all the intermediate images based on the convolutional neural network, and obtaining the at least one image having a face image by screening based on a result of the face recognition.

14. The method according to claim 13, wherein the performing face recognition on all the intermediate images based on the convolutional neural network comprises:

performing face recognition based on the convolutional neural network to obtain preset face recognition information, and evaluating the quality of the face image in the at least one image through the preset face recognition information.

15. The method according to claim 14, wherein the performing quality screening on the at least one image to obtain at least one first image comprises:

performing quality screening on the face image in the at least one image based on the preset face recognition information corresponding to the at least one image, and storing the image with face image quality reaching the preset threshold as the at least one first image.

16. The method according to claim 6, wherein the performing quality screening on the at least one image to obtain at least one first image comprises:

performing automatic exposure, automatic white balance, and 3D de-noise processing on the at least one image to obtain the at least one first image with display effect being optimized.

17. A photographing apparatus, comprising:

a memory storing processor-executable instructions; and a processor arranged to execute the stored processor-executable instructions to perform:

obtaining to-be-retrieved face information corresponding to a to-be-retrieved image by a convolutional neural network, the convolutional neural network being configured with corresponding convolution calculation configuration information by a processor, the convolutional neural network comprising at least one convolutional layer, the convolution calculation configuration information comprising a data bit width value corresponding to each convolutional layer in the convolutional neural network, and the to-be-retrieved image comprising at least one face region; and searching a database for matched preset face image information that matches the to-be-retrieved face information, the database storing at least one piece of preset face image information; and outputting the preset face image information that matches the to-be-retrieved face information;

wherein the processor is further arranged to execute the stored processor-executable instructions to perform:

reading the to-be-retrieved image from a front-end memory according to the convolution calculation configuration information, a bit width of the to-be-retrieved image being equal to the data bit width value; and performing convolution calculation on the to-be-retrieved image by the convolutional neural network to obtain the to-be-retrieved face information.

18. A face image retrieval system, provided with the photographing apparatus according to claim 17.

19. A non-transitory computer storage medium having stored thereon computer-readable instructions that, when executed by a processor, cause the processor to implement operations of a face image retrieval method, the method comprising:

obtaining to-be-retrieved face information corresponding to a to-be-retrieved image by a convolutional neural network, the convolutional neural network being configured with corresponding convolution calculation configuration information by a processor, the convolutional neural network comprising at least one convolutional layer, the convolution calculation configuration information comprising a data bit width value corresponding to each convolutional layer in the convolutional neural network, and the to-be-retrieved image comprising at least one face region;

searching a database for preset face image information that matches the to-be-retrieved face information, the database storing at least one piece of preset face image information; and outputting the preset face image information that matches the to-be-retrieved face information;

wherein the obtaining to-be-retrieved face information corresponding to a to-be-retrieved image by a convolutional neural network comprises:

reading the to-be-retrieved image from a front-end memory according to the convolution calculation configuration information, a bit width of the to-be-retrieved image being equal to the data bit width value; and performing convolution calculation on the to-be-retrieved image by the convolutional neural network to obtain the to-be-retrieved face information.

* * * * *